United States Patent [19]

Yum et al.

[11] Patent Number: 5,764,868
[45] Date of Patent: Jun. 9, 1998

[54] DEVICE FOR PRINTING VIDEO SIGNAL AND METHOD THEREOF

[75] Inventors: Jun-keun Yum; Doo-hwan Oh, both of Seoul, Rep. of Korea

[73] Assignee: SamSung Electronics Co., Ltd., Suwon, Rep. of Korea

[21] Appl. No.: 777,099

[22] Filed: Dec. 30, 1996

[30] Foreign Application Priority Data

Dec. 30, 1995 [KR] Rep. of Korea ............... 1995-69689

[51] Int. Cl.$^6$ ............................................. G06K 15/00
[52] U.S. Cl. ................................... 395/115; 395/112
[58] Field of Search .......................... 395/101, 111, 395/112, 115, 116, 834, 872, 876; 358/451, 453, 448, 404, 444, 462, 540; 345/507–510, 521, 522

[56] References Cited

U.S. PATENT DOCUMENTS

| | | |
|---|---|---|
| 5,129,050 | 7/1992 | Ikenoue et al. ............... 395/115 |
| 5,231,517 | 7/1993 | Taguchi ....................... 358/453 |
| 5,383,027 | 1/1995 | Harvey et al. . |
| 5,400,243 | 3/1995 | Oheda et al. . |
| 5,450,214 | 9/1995 | Nobuoka . |
| 5,546,194 | 8/1996 | Ross . |
| 5,552,905 | 9/1996 | Tanaka . |
| 5,566,003 | 10/1996 | Hara et al. . |
| 5,568,572 | 10/1996 | Shu . |

*Primary Examiner*—Arthur G. Evans
*Attorney, Agent, or Firm*—Robert E. Bushnell, Esq.

[57] ABSTRACT

A video signal printing device includes analog-to-digital converting mechanisms for converting a composite video signal into digital video data and signal separating mechanisms for separating horizontal/vertical sync signals from the composite video signal. The device may also include first storage mechanisms for storing the digital video data output from the analog-to-digital converting mechanisms, address generating mechanisms for generating an address according to the horizontal/vertical sync signals output from the signal separating mechanisms and outputting the address to the first storage mechanisms, second storage mechanisms for storing application programs and data with respect to a print mode according to paper size and image processing techniques, and data processing mechanisms for reading the digital video data stored in the first storage mechanisms according to the application programs and data stored in the second storage mechanisms and processing the read digital video data in accordance with a print mode selected by the user, and a video signal printing method thereof. The composite video signal can be printed.

16 Claims, 3 Drawing Sheets

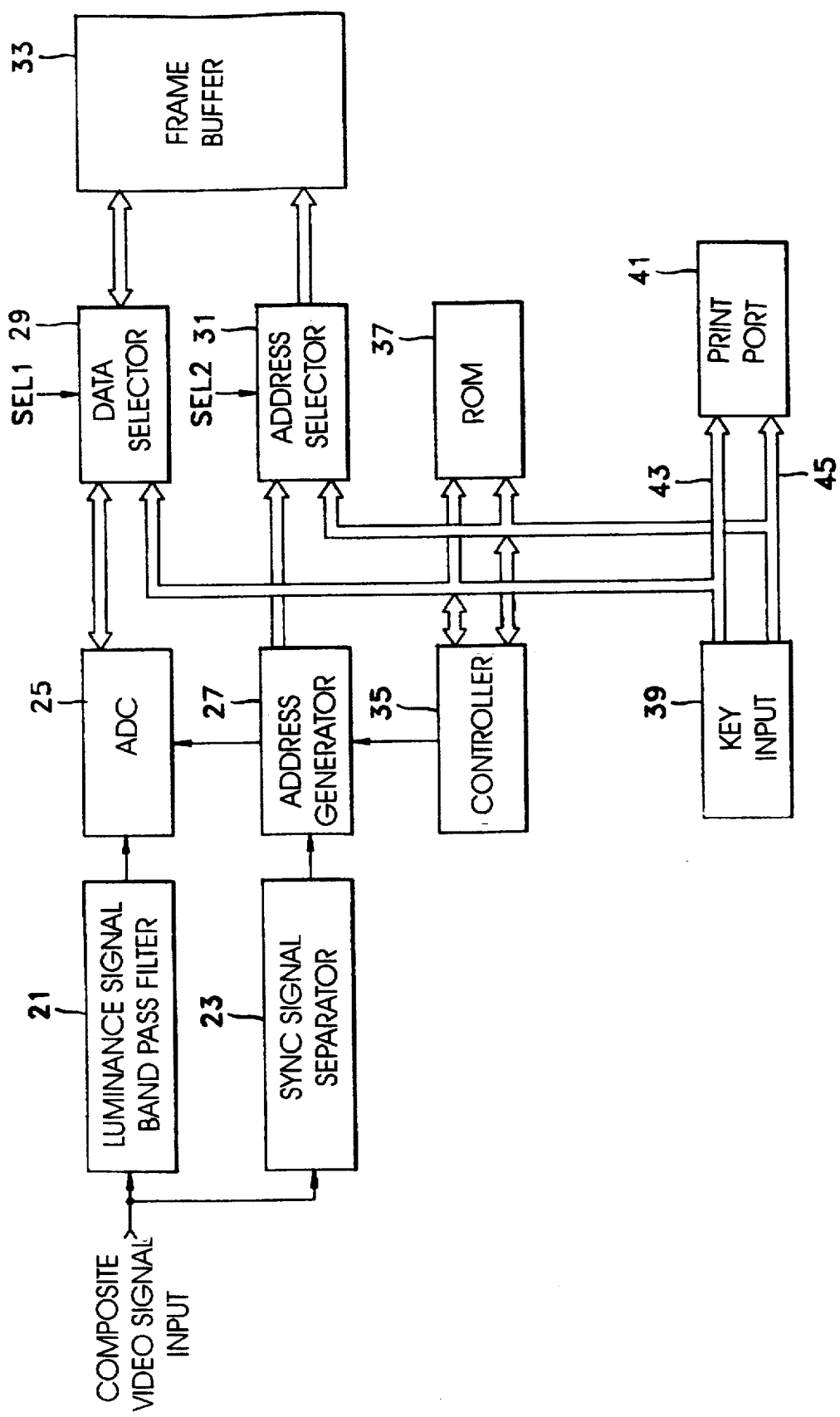

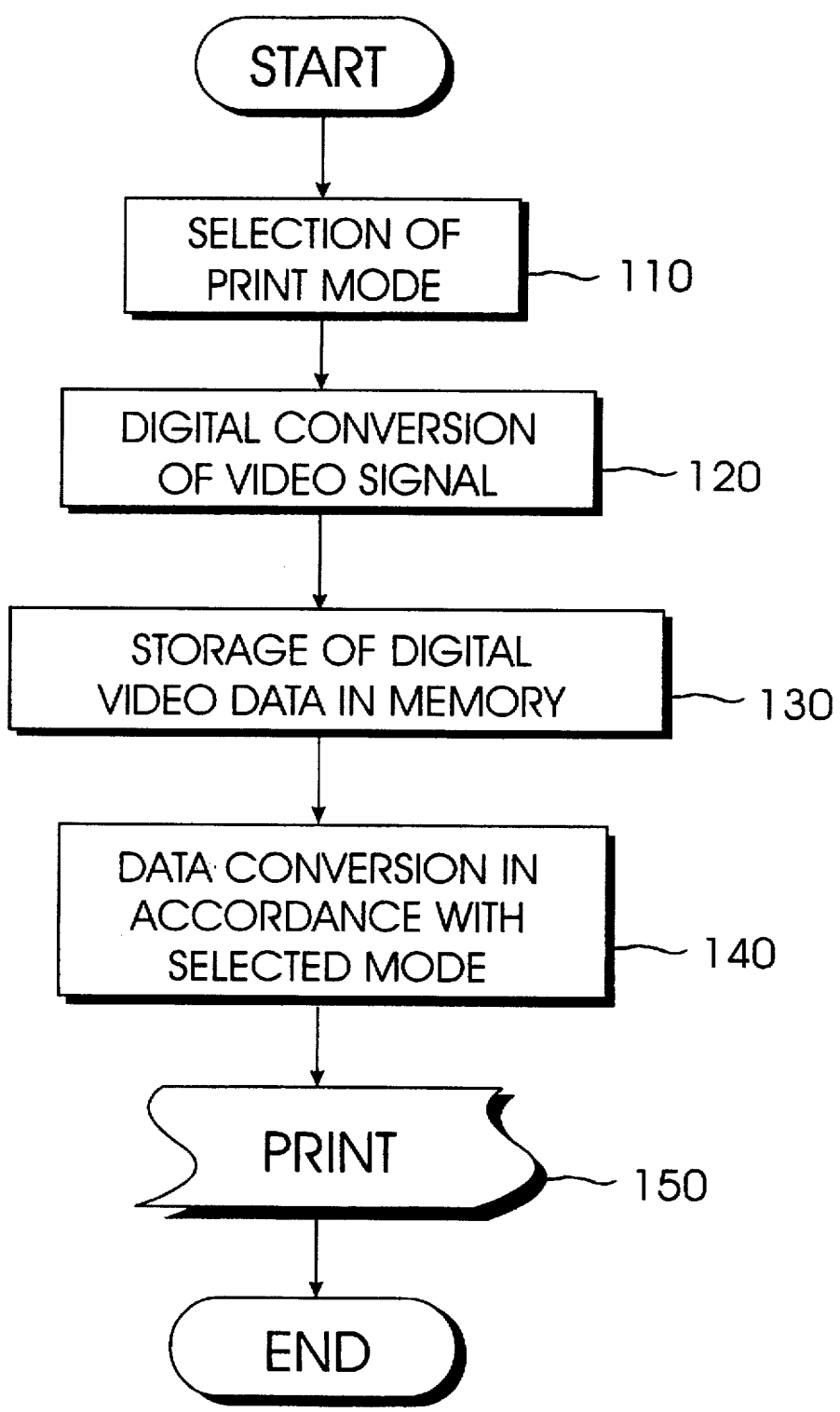

DEVICE FOR PRINTING VIDEO SIGNAL AND METHOD THEREOF

CLAIM OF PRIORITY

This application makes reference to, incorporates the same herein, and claims all benefits accruing under 35 U.S.C. §119 from an application for DEVICE FOR PRINTING VIDEO SIGNAL AND METHOD THEREOF earlier filed in the Korean Industrial Property Office on 30 Dec. 1995 and there duly assigned Ser. No. 69689/1995.

BACKGROUND OF THE INVENTION

1. Field of the Invention

The present invention relates to a video signal printing device. More particularly, the present invention relates to a video signal printing device for a child study apparatus which can print composite video signals and to a method of suitable for implementing the video signal printing device.

2. Description of the Related Art

Among the contemporary practice in this art, exemplars include Hara et al. (U.S. Pat. No. 5,566,003, Image Processing System In Which The Transmitter And Receiver Have Different Data Resolutions And Data Is Transmitted At The Receiver Resolution, Oct. 15, 1996) discussing an image processing system in which the transmitter and receiver have different data resolutions and data is transmitted at the receiver resolution. Shu (U.S. Pat. No. 5,568,572, Method And Apparatus For Tonal Correction in Binary Printing Devices By Predistortion of Image Data, Oct. 22, 1996) discusses a method and apparatus for tonal correction in binary printing devices by predistortion of image data. Tanaka (U.S. Pat. No. 5,502,905, Image Processing Apparatus Which Selects A Type Of Color Processing For Color Image Data Based On A Characteristic Of The Color Image Data, Sep. 3, 1996) discusses an image processing apparatus which selects a type of color processing for color image data based on a characteristic of the color image data. Ross (U.S. Pat. No. 5,546,194, Method And Apparatus For Converting A Video Image Format To A Group III FAX Format, Aug. 13, 1996) discusses a method and apparatus for converting a video image format to a group III fax format. Nobuoka (U.S. Pat. No. 5,450,214, Video Signal Processing Device, Sep. 12, 1995) discusses a video signal processing device designed to input selectively a first video signal or a sub-sampled second video signal. Oheda et al. (U.S. Pat. No. 5,400,243, Method Of Correcting Print Data And System Of Editing And Printing Documents, Mar. 21, 1995) discusses a method of correcting print data and system of editing and printing documents. Harvey et al. (U.S. Pat. No. 5,383,027, Portrait Printer System With Digital Image Processing Editing, Jan. 17, 1995) discusses a portraiture printer system which receives portrait film which carries portrait images provided by a portraiture camera. Based on my study of these exemplars and of the prior art, I find that there is a need for an effective and improved video signal printing device for a child study apparatus which can print composite video signal, particularly a device with the conversions, the storages, and (especially) the filters as in the present invention.

SUMMARY OF THE INVENTION

It is an object of the present invention to provide an improved video signal printing device for a child study apparatus.

It is another object of the present invention to provide an improved video signal printing device which can print composite video signals.

It is another object of the present invention to provide a video signal printing device which can print composite video signals by performing a data conversion according to a print mode.

It is another object of the present invention to provide a video signal printing device which can capture and print composite video signals (e.g., an NTSC, PAL or SECAM signal).

It is another object of the present invention to provide video signal printing methods suitable for implementing the above video signal printing devices.

To accomplish the one or more of the above objects, there is provided a video signal printing device for a child study apparatus including an analog-to-digital converting mechanism for converting a composite video signal into digital video data and a signal separating mechanism for separating horizontal and vertical sync signals from the composite video signal. A first storage mechanism stores the digital video data that is output from the analog-to-digital converting mechanism. An address generating mechanism generates an address according to the horizontal and vertical sync signals that is output from the signal separating mechanism and outputs the address to the first storage mechanism. A second storage mechanism stores application programs and data with respect to a print mode, according to paper size and image processing techniques. A data processing mechanism reads the digital video data stored in the first storage mechanism according to the application programs, reads the data stored in the second storage mechanism, and processes the read digital video data in accordance with a print mode selected by the user.

To accomplish one or more of the above objects, there is also provided a video signal printing method including the steps of: selecting a print mode according to paper size and image processing technique; generating digital video data through data conversion of a composite video signal; temporarily storing the generated digital video data; reading the temporarily stored digital video data; and processing the read digital video data in accordance with the selected print mode.

Using an embodiment of the present invention, a user can print a composite video signal by converting the composite video signal into a data format according to a selected print mode.

BRIEF DESCRIPTION OF THE DRAWINGS

The above object and advantage of the present invention will become more apparent by describing in detail a preferred embodiment thereof with reference to the attached drawings in which:

FIG. 2 is a block diagram illustrating a configuration of a video signal printing device according to the present invention; and FIG. 3 is a flowchart illustrating a method of printing video signals according to the present invention.

DETAILED DESCRIPTION OF THE INVENTION

Figure 1:
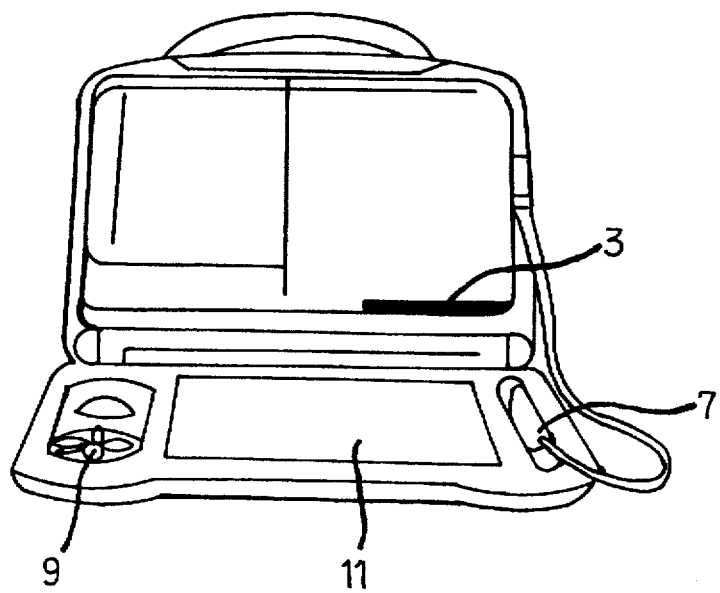
FIG. 1 is a front view of a study apparatus for children, to which a video signal printing device of the present invention may be applied.

FIG. 1 provides a front view of a study apparatus for children. As illustrated in FIG. 1, a software picture book (not shown) is inserted at a software picture book slot 3. As illustrated in FIG. 1, using a electric pen 7 or a control button 9. pictures are drawn or designated from the software picture book. The pictures are drawn or designated on a drawing board 11. The software picture book can be a device in which graphics information and application programs are recorded. The study apparatus shown in FIG. 1 can display pictures drawn and can display pictures from those in the software picture book, on a television screen (not shown), by outputting a video signal to the television screen. The above apparatus, however, cannot print the pictures.

As illustrated in FIG. 2, the luminance signal passband filter 21 passes only luminance signals. The luminance signal passband filter 21 removes chrominance signals and sync signals from a composite video signal. Thus, the luminance signal passband filter 21 causes to process a black and white signal. The synchronizing signal separator 23 separates horizontal/vertical sync signals from a composite video signals. The horizontal/vertical sync signals are needed to convert a uni-dimensional composite video signal into a two-dimensional video signal. The analog-to-digital converter (ADC) 25 receives video signals that is output from the luminance signal passband filter 21, with the luminance and sync signals removed, in response to a sampling clock signal. The analog-to-digital converter 25 converts the input signal into digital video data. Because a fast digital conversion is needed, a flash type analog-to-digital converter is adopted. The address generator 27, being controlled by the controller 35, generates an address to be output to the frame buffer 33. The address generator 27 generates the address in response to the horizontal/vertical sync signals output from the sync signal separator 23. The data selector 29 selects data input from the analog-to-digital converter 25 or from the data bus 43 in accordance with a selection signal (SEL1) and outputs the selected signal to the frame buffer 33. Also, the data selector 29 retrieves digital video data stored in the frame buffer 33, for transfer to the controller 35 via the data bus 43. The address selector 31 selects an address output from the address generator 27 or the controller 35 in accordance with a selection signal (SEL2) and outputs the selected address to the frame buffer 33 via an address bus 45.

The frame buffer 33 stores the input digital video data. The ROM 37 stores operating programs. The controller 35 processes the image corresponding to the digital video data according to the operating program stored in the ROM 37. The processed digital video data is stored in the frame buffer 33 via the data selector 29. The key input portion 39, which allows a user to input a print mode selection, generates a corresponding code in accordance with the selected print mode and outputs the generated code to the controller 35. The print port 41 is for transferring processed image data to a printer (not shown).

FIG. 3 illustrates a method of printing video signals according to the present invention. The operation according to the above construction will now be described with reference to FIG. 3, as follows.

First, if a user selects a print mode via the key input portion 39, the controller 35 receives the codes corresponding to the selected print mode and then sets up a print mode (step 110). At this time, various print modes are available according to paper size and image processing techniques (e.g., a gray, a reversal, an outer line correction and a boundary extraction).

Subsequently, in an analog composite video signal, e.g., an NTSC, PAL or SECAM standard video signal, the chrominance and sync signals are removed by the luminance signal passband filter 21. Thus, only a luminance signal is passed, allowing for monochrome printing. For color printing, on the other hand, only the sync signals are removed.

Next, the signals having passed through the luminance signal passband filter 21 are converted into digital video data by the analog-to-digital converter 25 (step 120).

Next, the digital video data is temporarily stored in the frame buffer 33, via the data selector 29, for data processing in preparation for printing (step 130).

The digital video data, temporarily stored in the frame buffer 33 in accordance with a predetermined print mode, is transferred to the controller 35 through the data selector 29, where a data-conversion takes place. That is, the controller 35 performs a data conversion according to a corresponding processing routine stored in the ROM 37 on the basis of a user-selected print mode, e.g., paper size or image processing technique (step 140).

The converted digital video data is output to a printer through the print port 41 and printed according to a predetermined print mode (step 150).

As described above, the present invention enables the printing of a composite video signal, by performing a data conversion according to the selected print mode. Particularly, the selected the video signal printing device and method of the present invention can be applied to a study apparatus for children's use, so that the effectiveness of a child's study can be enhanced by printing a picture drawn with an electric pen or other means.

What is claimed is:

1. A video signal printing device of a child study apparatus, comprising:

a converter for converting a composite video signal representative of an image formation from said child study apparatus into digital video data;

a separator for separating synchronization signals from the composite video signal;

first storage means for storing the digital video data from said converter;

an address generator for generating addresses in accordance with said synchronization signals from said separator;

second storage means for storing application programs and application data with respect to a print mode in accordance with a paper size, and an image processing technique;

a data processor for processing the digital video data stored in said first storage means according to the application programs stored in said second storage means;

a data selector for selecting the digital video data from said converter for storage in said first storage means in accordance with a first selection signal, and for enabling transmission of stored video data from said first storage means to said data processor for image conversion in accordance with said image processing technique;

an address selector for selecting addresses from said address generator for enabling said first storage means to store the digital video data from said converter; and a key input for permitting user input of said print mode for enabling printing of said processed video data from said data processor on a recording medium via a print port.

2. A video signal printing device for a child study apparatus, comprising:

a converter for converting a composite video signal representative of an image formation from said child study apparatus into digital video data;

a separator for separating synchronization signals from the composite video signal;

a first memory for storing the digital video data from said converter;

an address generator for generating said addresses according to said synchronization signals for storage of the digital video data in said first memory;

a second memory for storing application programs for enabling image conversion with different paper sizes and different image processing techniques; and a controller for controlling image conversion of the digital video data stored in said first memory according to the application programs stored in said second memory on the basis of a user-selected print mode for a specific paper size and with a specific image processing technique.

3. The video signal printing device of claim 2, further comprising filtering means for filtering said composite video signal to pass only luminance components of said composite video signal prior to conversion into said digital video data, when a monochrome print mode for black and white printing is set by a user.

4. The video signal printing device of claim 3, further comprising a data selector for selecting data input from said converter and said controller for storage in said first memory.

5. The video signal printing device of claim 3, further comprising an address selector for selecting addresses from said address generator and said controller for storage of said digital video data in said first memory.

6. The video signal printing device of claim 3, further comprising a key input unit for permitting user input of a print mode in accordance with a selected paper size and with a selected image processing technique.

7. The video signal printing device of claim 3, further comprised of said filter means passing both luminance and chrominance components of said composite video signals, when a color print mode for color printing is set by a user.

8. The video signal printing device of claim 3, further comprised of said converter corresponding to a flash-type of analog-to-digital converter.

9. The video signal printing device of claim 2, further comprising a data selector for selecting data input from said converter and said controller for storage in said first memory.

10. The video signal printing device of claim 2, further comprising an address selector for selecting addresses from said address generator and said controller for storage of said digital video data in said first memory.

11. The video signal printing device of claim 2, further comprising a key input unit for permitting user input of a print mode in accordance with a selected paper size and with a selected image processing a technique.

12. The video signal printing device of claim 2, further comprised of said filter means passing both luminance and chrominance components of said composite video signal, when a color print mode for color printing is set by a user.

13. The video signal printing device of claim 2, further comprised of said converter corresponding to a flash-type of analog-to-digital converter.

14. A method of printing a video signal representative of an image formation from a study apparatus, comprising the steps of:

converting a video signal representative of an image formation from said study apparatus into digital video data;

separating synchronization signals from the video signal, and generating addresses in accordance with said synchronization signals;

storing the digital video data in a frame buffer;

processing the digital video data stored in said frame buffer in accordance with application programs stored in a read-only-memory on the basis of a user-selected print mode for a specific paper size and with a specific image processing technique.

15. The method of claim 14, further comprising the steps of:

removing chrominance components and said synchronization signals from said video signal;

passing only luminance components of said video signal; and converting said luminance components of said video signal into said digital video data.

16. A video signal printing device for a study apparatus, comprising:

a key input unit for permitting a user to select a print mode for printing an image formed from said study apparatus with a specific paper size and a specific image formation;

a first memory for storing application programs for enabling printing said image with different paper sizes and different image formations;

a converter for converting a composite video signal representative of said image formed from said study apparatus into video data;

a second memory for storing said video data;

a synchronous separator for separating synchronization signals from the composite video signal;

an address generator for generating addresses in accordance with said synchronization signals for storage of said video data in said second memory; and a controller for controlling the storage of said video data in said second memory, the image conversion of said video data stored in said second memory in accordance with the application programs stored in said first memory on the basis of said print mode selected by a user from said key input unit for a specific paper size and with a specific image formation.

* * * * *